(12) United States Patent
Wirola et al.

(10) Patent No.: US 10,785,742 B2
(45) Date of Patent: Sep. 22, 2020

(54) WIRELESS ACCESS POINT IDENTIFIER COMPRISING RADIO MAP DATA

(71) Applicant: HERE GLOBAL B.V., Eindhoven (NL)

(72) Inventors: Lauri Aarne Johannes Wirola, Tampere (FI); Jani Kappi, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/044,057

(22) Filed: Jul. 24, 2018

(65) Prior Publication Data
US 2020/0037282 A1 Jan. 30, 2020

(51) Int. Cl.
*H04W 36/32* (2009.01)
*H04W 64/00* (2009.01)
(Continued)

(52) U.S. Cl.
CPC .......... *H04W 64/00* (2013.01); *H04B 17/318* (2015.01); *H04W 24/10* (2013.01); *H04W 84/12* (2013.01)

(58) Field of Classification Search
CPC ..... H04W 4/02; H04W 64/00; H04W 88/085; H04W 48/16; H04W 4/80; H04W 4/12; H04W 4/29; H04W 84/12; H04W 24/10; H04W 12/06; H04W 16/14; H04W 36/32; H04W 84/10
USPC .......... 455/456.3, 456.1, 507, 411, 438, 41.2, 455/434, 436, 456.6; 370/331, 338, 353, 370/312, 252
See application file for complete search history.

(56) References Cited

U.S. PATENT DOCUMENTS 5,787,077 A * 7/1998 Kuehnel ............ H04Q 11/0478
370/331
8,265,652 B2 9/2012 Piersol et al.
(Continued)

FOREIGN PATENT DOCUMENTS

EP 2309803 A1 4/2011
WO WO 2015/024758 A1 2/2015
(Continued)

OTHER PUBLICATIONS

Bluetooth advertising [online] [retrieved Dec. 12, 2019]. Retrieved from the Internet: https://web.archive.org/web/20160911144131/https://en.wikipedia.org/wiki/Bluetooth_advertising (dated Sep. 11, 2016) 2 pages.
(Continued)

*Primary Examiner* — William D Cumming
(74) *Attorney, Agent, or Firm* — Alston & Bird LLP

(57) ABSTRACT

A method, performed by at least one apparatus, is provided that includes obtaining, at a wireless access point, radio map data which enables a determination of characteristics of radio signals transmitted by the wireless access point. The characteristics of the radio signals are expected to be observable at different locations. Additionally, the method includes repeatedly providing, by the wireless access point, one or more identifiers of the wireless access point. The one or more identifiers include the radio map data or a part thereof to enable mobile devices receiving the one or more identifiers to determine their position based on the radio map data.

21 Claims, 5 Drawing Sheets

(51) Int. Cl.
*H04W 4/029* (2018.01)
*H04W 12/06* (2009.01)
*H04W 24/10* (2009.01)
*H04W 84/10* (2009.01)
*H04W 4/12* (2009.01)
*H04B 17/318* (2015.01)
*H04W 84/12* (2009.01)

(56) References Cited

U.S. PATENT DOCUMENTS

| | | | | |
|---|---|---|---|---|
| 8,433,341 B2* | 4/2013 | Dredge | ................. | H04W 4/029 |
| | | | | 455/456.3 |
| 8,605,693 B2* | 12/2013 | So | ................. | H04W 12/06 |
| | | | | 370/338 |
| 8,649,388 B2* | 2/2014 | Evans | ................. | H04W 88/085 |
| | | | | 370/353 |
| 8,725,170 B1* | 5/2014 | Boyle | ................. | H04W 24/10 |
| | | | | 370/252 |
| 8,761,706 B2* | 6/2014 | Chemishkian | ........ | H04W 84/18 |
| | | | | 370/338 |
| 8,933,841 B2* | 1/2015 | Valaee | ................. | H04W 64/00 |
| | | | | 342/451 |
| 8,958,354 B2* | 2/2015 | Das | ................. | H04W 4/12 |
| | | | | 370/312 |
| 9,131,347 B2* | 9/2015 | Venkatraman | ........ | H04W 4/029 |
| 9,386,459 B2* | 7/2016 | Stanforth | ................. | H04W 16/14 |
| 9,432,813 B2* | 8/2016 | Ahn | ................. | G01S 5/0236 |
| 9,763,035 B2* | 9/2017 | Valaee | ................. | H04W 64/00 |
| 9,794,984 B2 | 10/2017 | Edge | | |
| 9,939,515 B2* | 4/2018 | Wirola | ................. | G01S 5/0252 |
| 10,267,894 B2* | 4/2019 | Wirola | ................. | G01S 5/0252 |
| 10,306,399 B2* | 5/2019 | Khan | ................. | H04W 4/02 |
| 10,397,739 B2* | 8/2019 | Ivanov | ................. | H04W 4/029 |
| 2008/0102835 A1* | 5/2008 | Zhao | ................. | H04W 36/32 |
| | | | | 455/436 |
| 2010/0197325 A1* | 8/2010 | Dredge | ................. | H04L 67/18 |
| | | | | 455/456.3 |
| 2012/0057572 A1* | 3/2012 | Evans | ................. | H04W 88/085 |
| | | | | 370/338 |
| 2012/0149415 A1* | 6/2012 | Valaee | ................. | H04W 64/00 |
| | | | | 455/507 |
| 2014/0323160 A1* | 10/2014 | Venkatraman | ........... | G01C 5/06 |
| | | | | 455/456.6 |
| 2014/0364139 A1 | 12/2014 | Lipman et al. | | |
| 2015/0072680 A1* | 3/2015 | Ogawara | ............... | H04W 48/16 |
| | | | | 455/434 |
| 2015/0105051 A1* | 4/2015 | Valaee | ................. | H04W 12/02 |
| | | | | 455/411 |
| 2015/0223027 A1* | 8/2015 | Ahn | ................. | G01S 5/0236 |
| | | | | 455/456.1 |
| 2015/0281878 A1* | 10/2015 | Roundtree | .............. | H04W 4/80 |
| | | | | 455/41.2 |
| 2016/0037443 A1* | 2/2016 | Kim | ................. | H04W 52/028 |
| | | | | 455/438 |
| 2016/0161592 A1 | 6/2016 | Wirola et al. | | |
| 2016/0161593 A1* | 6/2016 | Wirola | ................. | H04W 64/003 |
| | | | | 455/456.1 |
| 2017/0150371 A1* | 5/2017 | Cichonski | ............ | H04W 16/18 |
| 2018/0136308 A1 | 5/2018 | Wirola et al. | | |
| 2018/0180704 A1* | 6/2018 | Khan | ................. | G01S 5/0236 |
| 2018/0184287 A1* | 6/2018 | Khan | ................. | H04L 9/0816 |
| 2018/0192253 A1* | 7/2018 | Khan | ................. | H04W 4/029 |
| 2018/0199190 A1* | 7/2018 | Khan | ................. | H04L 63/0428 |
| 2018/0255430 A1* | 9/2018 | Ivanov | ................. | H04W 4/023 |
| 2018/0288561 A1* | 10/2018 | Khan | ................. | H04B 17/27 |
| 2020/0037282 A1* | 1/2020 | Wirola | ................. | H04W 24/10 |

FOREIGN PATENT DOCUMENTS

| | | | | |
|---|---|---|---|---|
| WO | WO 2016/180480 A1 | 11/2016 | | |
| WO | WO 2017/000979 A1 | 1/2017 | | |
| WO | WO201700979 A1 * | 1/2017 | ............... | G01S 5/02 |

OTHER PUBLICATIONS

Service set (802.11 networks) [online] [retrieved Dec. 12, 2019]. Retrieved from the Internet: https://web.archive.org/web/20180815035641/https://en.wikipedia.org/wiki/Service_set_(802.11_network) (dated Aug. 15, 2018) 4 pages.

ScanResult | Android Developers [online] [retrieved Dec. 12, 2019]. Retrieved from the Internet: https://web.archive.org/web/20181114134650/https://developer.android.com/reference/android/net/wifi/ScanResult (dated Nov. 14, 2018) 15 pages.

A BLE Advertising Primer—Argenox Technologies [online] [retrieved Dec. 12, 2019]. Retrieved from the Internet: https://web.archive.org/web/20180630091942/http://www.argenox.com/a-ble-advertising-primer/ (dated Jun. 20, 2018) 14 pages.

802.11 Fundamentals, Chapter 12 [online] [retrieved Dec. 12, 2019]. Retrieved from the Internet: https://web.archive.org/web/20161103044935/https://www.cisco.com/c/en/us/td/docs/solutions/Enterprise/Borderless_Networks/Unified_Access/CMX/CMX_802Fund.pdf (dated Nov. 3, 2016) 4 pages.

\* cited by examiner

WIRELESS ACCESS POINT IDENTIFIER COMPRISING RADIO MAP DATA

FIELD OF THE DISCLOSURE

The invention relates to the field of positioning and more specifically to the provision of radio map data for us in positioning of mobile devices.

BACKGROUND

Seamless and all time available positioning methods require novel systems and solutions that are specifically developed (and if necessary also deployed) for this purpose. The traditional positioning technologies, which are mainly used outdoors, i.e. satellite and cellular positioning technologies, cannot always deliver the desired performance that would enable seamless and equal navigation experience at all time, particularly indoors. As examples, required positioning accuracy (2-3 m), coverage (~100%) and floor detection are challenging to achieve with satisfactory performance levels with the systems and signals that were not designed and specified for every use case in the first place. For instance, in case of indoor positioning, satellite-based radio navigation signals simply do not penetrate through the walls and roofs for the adequate signal reception and the cellular signals often have a too narrow bandwidth for accurate ranging by default. But also in outdoor scenarios, there may be the case of insufficient coverage of e.g. satellite-based radio navigation, for instance in case of bad weather or urban street canyons.

Several dedicated solutions have already been developed and commercially deployed during the past years e.g. solutions based on technologies like pseudolites (GPS-like short-range beacons), ultra-sound positioning, Bluetooth or Bluetooth LE signals and WLAN fingerprinting. What is typical to these solutions is that they require either deployment of totally new infrastructure (such as beacons or tags) or manual exhaustive radio-surveying of the streets and buildings including all the floors, spaces and rooms. This is rather expensive and will take a considerable amount of time to build the coverage to the commercially expected level, which can in some cases narrow the potential market segment to only a very thin customer base e.g. for health care or dedicated enterprise solutions. Also, the diversity of these technologies makes it difficult to build a globally scalable indoor positioning solution, and the integration and testing will become complex if a large number of technologies needs to be supported in the consumer devices, such as smartphones.

For an alternative positioning solution to be commercially successful it needs to be globally scalable, have low maintenance and deployment costs, and offer acceptable end-user experience. This can best be achieved, if the solution is based on an existing infrastructure in the buildings and on existing capabilities in the consumer devices. Accordingly, such a positioning is preferably based on technologies like Wi-Fi- and/or Bluetooth (BT)-technologies that are already supported in almost every smartphone, tablet, laptop and even in the majority of the feature phones. It is, thus, required to find a solution that uses such cellular or non-cellular radio signals in such a way that makes it possible to achieve 2-3 m horizontal and vertical positioning accuracy with the ability to quickly build the global coverage for this approach.

One approach for such radio-based positioning models e.g. the WLAN radio environment (or any similar radio e.g. Bluetooth) from observed Received Signal Strength (RSS)-measurements as (e.g. 2-dimensional) radio maps.

For this, accordingly high volumes of radio signal measurement data (so called radio fingerprints or simply fingerprints) need to be harvested via crowd-sourcing if the consumer devices are equipped with the necessary functionality to enable the radio signal data collection as a background process, naturally with the end-user consent. It could also be possible to use volunteers to survey the sites in exchange of reward or recognition and get the coverage climbing up globally in the places and venues important for the key customers. While automated crowd-sourcing can enable indoor localization in large amount of buildings, manual data collection using special tools may be the best option, when the highest accuracy is desired.

This phase is called "collecting phase", "training phase" or "radio mapping". In this radio mapping phase typically samples containing information on the geolocation (like latitude, longitude, altitude; or x, y, floor) and radio measurements (typically comprising WLAN and/or Bluetooth radio node identities and signal strengths) are collected. Having these samples allows understanding how the radio signals behave and travel in particular in the building. This understanding is called a radio map. The radio map enables a localization capability to devices: when a respective device observes varying radio signals, the signals can be compared to the radio map resulting in a position estimate of the device.

Utilizing such radio maps at a respective mobile device for positioning the mobile device may, however, be linked to certain difficulties or drawbacks. On the one hand, the radio map needs to be transferred and stored at the mobile device. The respective radio map data may take up considerable storage space, particularly at mobile devices and particularly in case such data is transferred ahead of time for large geographic areas, such as cities or countries, e.g. for offline usage. On the other hand, if such radio map data is to be received at the mobile device on the fly and only if needed, the wireless data connection of the mobile device needs to be used, which may negatively affect the data plan of the user, for instance. In the worst case, an internet connection may not even be available, so that the mobile device could not even obtain respective radio map data from e.g. a remote server. Specifically, in case radio signals of wireless access points shall be used for positioning, the techniques used for other systems (e.g. Bluetooth systems) cannot be directly transferred to wireless access points.

SUMMARY OF SOME EMBODIMENTS OF THE INVENTION

Thus, it is inter alia an objective of the present application to mitigate the above described drawbacks and in particular to provide a simple, effective and standard-compatible way of providing radio map data of wireless access points to mobile devices for use in positioning.

According to a first exemplary aspect of the invention a method (also referred to as first method), performed by at least one apparatus, is disclosed, the method comprising:
  obtaining, at a wireless access point, radio map data which enables a determination of characteristics of radio signals transmitted by the wireless access point, wherein the characteristics of radio signals are expected to be observable at different locations; and
  repeatedly providing, by the wireless access point, one or more identifiers of the wireless access point, the one or more identifiers comprising the radio map data or a part thereof to enable mobile devices receiving the one or more identifiers to determine their position based on the radio map data.

The first method may for instance be performed and/or controlled by an apparatus according to the first exemplary aspect, e.g. an access point or a module thereof, as further described below.

According to a second exemplary aspect of the invention a method (also referred to as second method), performed by at least one apparatus, is disclosed, the method comprising:
  obtaining characteristics of radio signals, the radio signals transmitted by a plurality of wireless access points and the characteristics of radio signals measured by at least one mobile device at each of a plurality of locations, and obtaining indications of the locations of measurement;
  assembling, based on the obtained characteristics of radio signals and the obtained indications of the locations of measurement, separately for each of the wireless access points radio map data which enables a determination of characteristics of radio signals transmitted by the respective wireless access point, wherein the characteristics of radio signals are expected to be observable at different locations; and
  providing the radio map data assembled for the respective wireless access point as a basis for a repeated provision of one or more identifiers comprising the radio map data or a part thereof by the respective wireless access point to enable mobile devices receiving the one or more identifiers from at least one of the plurality of wireless access points to determine their positions.

The second method may for instance be performed and/or controlled by an apparatus according to the second exemplary aspect, e.g. a server or a module thereof, as further described below.

According to a third exemplary aspect of the invention a method (also referred to as third method), performed by at least one apparatus, is disclosed, the method comprising:
  obtaining at least one characteristic of at least one radio signal, the at least one radio signal transmitted by a wireless access point and the at least one characteristic of the at least one radio signal measured by a mobile device at a particular location;
  obtaining one or more identifiers of the wireless access point provided by the wireless access point;
  extracting from the one or more identifiers radio map data which enables a determination of characteristics of radio signals transmitted by the wireless access point that are expected to be observable at different locations; and
  estimating a position of the mobile device based on the at least one measured characteristic of the at least one radio signal and the radio map data which enables a determination of characteristics of radio signals that are expected to be observable at different locations.

The third method may for instance be performed and/or controlled by an apparatus according to the third exemplary aspect, e.g. a mobile device or a module thereof, as further described below.

According to the first, second and third exemplary aspect of the invention, in each case an apparatus (also referred to as first, second, third apparatus) is disclosed, comprising means for performing a method according to the respective exemplary aspect of the invention. The means of the apparatus may be implemented in hardware and/or software. They may comprise for instance at least one processor for executing computer program code for realizing the required functions, at least one memory storing the program code, or both. Alternatively, they could comprise for instance circuitry that is designed to realize the required functions, for instance implemented in a chipset or a chip, like an integrated circuit. In general, the means may comprise for instance one or more processing means such as a processor and a memory. Optionally, the apparatus may comprise various other components, like a communication interface, a network interface, a radio interface, a data interface, a user interface etc.

According to the first, second and third exemplary aspect of the invention, in each case an alternative apparatus (also referred to as first, second, third apparatus) is disclosed, comprising at least one processor and at least one memory including computer program code; the at least one memory and the computer program code configured to, with the at least one processor, cause the apparatus to at least perform a method according to the respective exemplary aspect of the invention.

Thus, there is inter alia disclosed a (first) apparatus comprising at least one processor and at least one memory including computer program code, the at least one memory and the computer program code configured to, with the at least one processor, cause an apparatus at least to perform:
  obtaining, at a wireless access point, radio map data which enables a determination of characteristics of radio signals transmitted by the wireless access point, wherein the characteristics of radio signals are expected to be observable at different locations; and
  repeatedly providing, by the wireless access point, one or more identifiers of the wireless access point, the one or more identifiers comprising the radio map data or a part thereof to enable mobile devices receiving the one or more identifiers to determine their position based on the radio map data.

Further, there is disclosed a (second) apparatus comprising at least one processor and at least one memory including computer program code, the at least one memory and the computer program code configured to, with the at least one processor, cause an apparatus at least to perform:
  obtaining characteristics of radio signals, the radio signals transmitted by a plurality of wireless access points and the characteristics of radio signals measured by at least one mobile device at each of a plurality of locations, and obtaining indications of the locations of measurement;
  assembling, based on the obtained characteristics of radio signals and the obtained indications of the locations of measurement, separately for each of the wireless access points radio map data which enables a determination of characteristics of radio signals transmitted by the respective wireless access point, wherein the characteristics of radio signals are expected to be observable at different locations; and
  providing the radio map data assembled for the respective wireless access point as a basis for a repeated provision of one or more identifiers comprising the radio map data or a part thereof by the respective wireless access point to enable mobile devices receiving the one or more identifiers from at least one of the plurality of wireless access points to determine their positions.

There is also disclosed a (third) apparatus comprising at least one processor and at least one memory including computer program code, the at least one memory and the computer program code configured to, with the at least one processor, cause an apparatus at least to perform:

obtaining at least one characteristic of at least one radio signal, the at least one radio signal transmitted by a wireless access point and the at least one characteristic of the at least one radio signal measured by a mobile device at a particular location;

obtaining one or more identifiers of the wireless access point provided by the wireless access point;

extracting from the one or more identifiers radio map data which enables a determination of characteristics of radio signals transmitted by the wireless access point that are expected to be observable at different locations; and estimating a position of the mobile device based on the at least one measured characteristic of the at least one radio signal and the radio map data which enables a determination of characteristics of radio signals that are expected to be observable at different locations.

The above-disclosed apparatuses according to any aspect of the invention may be a module or a component for a device, for example a chip. Alternatively, the disclosed apparatus according to any aspect of the invention may be a device, for instance a mobile device or a server. The disclosed apparatus according to any aspect of the invention may comprise only the disclosed components, for instance means, processor, memory, or may further comprise one or more additional components.

According to the first, second and third exemplary aspect of the invention, in each case a computer program code is disclosed, the computer program code, when executed by a processor, causing an apparatus to perform a method according to the respective exemplary aspect of the invention.

The computer program may be stored on computer-readable storage medium, in particular a tangible and/or non-transitory medium. The computer readable storage medium could for example be a disk or a memory or the like. The computer program could be stored in the computer readable storage medium (e.g. according to the exemplary aspect of the invention) in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to the first, second and third aspect of the invention, in each case a non-transitory computer readable storage medium is disclosed, in which computer program code is stored, the computer program code when executed by a processor causing at least one apparatus to perform a method according to the respective exemplary aspect of the invention. The storage medium may be a tangible storage medium, for example a tangible computer-readable storage medium, e.g. as described above. The storage medium may be a storage medium of an apparatus (e.g. a mobile device) according to the respective exemplary aspect of the invention.

In the following, exemplary features and exemplary embodiments of all aspects of the present invention will be described in further detail.

As already explained, the method of the first aspect may be performed by the wireless access point. The wireless access point may be a stationary device. A stationary device is configured to be stationary when in operation and/or fixed to a particular location. A stationary device may be ground based and thus stationary with respect to Earth or at least stationary within a particular environment. The wireless access points may equally be a module, like a chip or circuitry on a chip, for another stationary device (such as a router for instance). Optionally, a wireless access point may comprise various other components, like a data interface, a user interface, a further memory, a further processor, etc.

The radio map data may be obtained at the wireless access point e.g. by receiving the radio map data, e.g. from another apparatus, such as the second apparatus, which may be a server, for instance. The radio map data may be received over a network, such as the internet.

The radio map data may generally comprise or consist of any data which enables a determination of characteristics of radio signals transmitted by the wireless access point, wherein the characteristics of radio signals are expected to be observable at different locations. Thus, the radio map data may be understood as data describing the radio environment caused by the respective wireless access point. The radio map data may be limited to only comprise radio map data with respect to the respective wireless access point. Thus, the radio map data can be considered as wireless access point specific radio map data.

A wireless access point may in particular be understood as a networking hardware device that allows another device (e.g. a mobile device) to wirelessly connect to another (e.g. wired) network. A switch or a router with wireless connectivity may also be considered to be, be part of or comprise a wireless access point, i.e. the wireless access point may be considered to be a component of such a device, e.g. the wireless access point may connect to a router (e.g. via a wired network) as a standalone device, but it can also be an integral component of the router itself. The wireless access point is in particular a non-cellular wireless access point (i.e. an access point of a non-cellular wireless network).

An identifier of the wireless access point is understood to be associated with the respective wireless access point or the radio network which is provided by the wireless access point. The identifier may in particular be obtained (e.g. received) over the respective radio network of the wireless access point itself. However, the identifier may be provided by and thus obtained from the wireless access point without the need of establishing a connection with the respective wireless access point. The identifier (or at least a part thereof) may generally be set or modified by a user of the respective wireless access point. The identifier may for instance be associated with layer 2 of the OSI model. As will be explained in more detail below, the identifier may in particular be a service set identifier, such as an SSID, for instance.

The one or more identifiers may be provided by the wireless access point by sending or transmitting (e.g. via a transmitter) the one or more identifiers. Repeatedly providing the one or more identifiers may be realized with a fixed or variable interval, for instance. In case more than one identifier is provided, the identifiers may be provided in an alternating manner, for instance.

That the one or more identifiers comprise the radio map data is understood to mean that the radio map data is included in the one or more identifiers. In case one identifier is used, it is understood that the complete radio map data of the respective wireless access point can be comprised by a single identifier (which is however provided repeatedly). In case more than one identifier is used, it is understood that two or more (different) identifiers need to be provided in order to provide the complete radio map data of the respective wireless access point. For instance, the one or more identifiers may or may not comprise other data. For instance, the one or more identifiers may consist only of data used for providing the radio map data, i.e. the radio map data (payload) itself and optionally non payload data (e.g. paging data, particularly in case multiple identifiers need to be used to provide the radio map data).

The described actions may be performed by each of a plurality of wireless access points to enable mobile devices to determine their own positions more precisely and at various locations.

In order to enable a (first) apparatus (e.g. the wireless access point) to perform the described first method, a second method may first be performed by a second apparatus (e.g. a server).

In example embodiments of the second method, the characteristics of radio signals transmitted by a plurality of wireless access points and measured by at least one mobile device at each of a plurality of locations may be obtained (e.g. received from the at least one mobile device). Also, indications of the locations of measurement are obtained. This allows for assembling, separately for each of the wireless access points, radio map data. Therein, the radio map data enables a determination of characteristics of radio signals transmitted by the respective wireless access point, wherein the characteristics of radio signals are expected to be observable at different locations. During the assembly, radio map data may be subject to one or more data transforms and/or one or more data compressions (as described further below). The assembled (and in particular wireless access point specific) radio map data can then be provided (e.g. send/transmitted to the respective wireless access point) as a basis for a repeated provision of one or more identifiers comprising the radio map data or a part thereof by the respective wireless access point. This enables mobile devices receiving the one or more identifiers from at least one of the plurality of wireless access points to determine their positions.

Estimating a position can then be done by a (third) apparatus (e.g. the mobile device) as described with respect to a third method.

In example embodiments of the third method, at least one radio signal transmitted by a wireless access point and at least one characteristic of the at least one radio signal is measured by a mobile device at a particular location. This allows for obtaining (e.g. received at the mobile device) the at least one characteristic of the at least one radio signal. Also, one or more identifiers (comprising the radio map data as described above) of the wireless access point and provided by the wireless access point are obtained (e.g. received at the mobile device). This enables an extraction of respective radio map data from the one or more identifiers. As described, the radio map data enables a determination of characteristics of radio signals transmitted by the wireless access point that are expected to be observable at different locations. As part of or after the extraction, the radio map data may be subject to one or more (inverse) data transforms and/or data decompressions (as described further below). Based on the at least one measured characteristic of the at least one radio signal and the radio map data (which enables a corresponding determination of characteristics of radio signals that are expected to be observable at different locations) a position of the mobile device can be estimated, e.g. by matching the measured characteristics of the at least one radio signal with the expected characteristics of radio signals.

As a result, embodiments of the invention may have the effect that each wireless access point can separately provide its own radio map via its identifier(s). Embodiments may thus enable mobile devices to determine their own position based on detected radio signals and on radio map data which enables a determination of expected characteristics of radio signals at different locations. Certain embodiments of the invention may have the effect that they contribute to a self-contained positioning system that does not require an Internet connection or a wired connection to a server of a positioning provider to download the required radio map data to the mobile devices. Certain embodiments of the invention may have the effect that they enable mobile devices with very small memory to determine their own position using such radio map data, since the mobile devices will only need to store radio map data for wireless access points that may be observed at their current location. The number of wireless access points for which radio map data has to be stored at the same time at a mobile device may thus be quite small compared to the entire radio map data for wireless access points of a whole site, like a whole building or a whole floor of a building.

According to an exemplary embodiment of the different aspects of the invention, the one or more identifiers are provided by the wireless access point by automatically and repeatedly broadcasting the one or more identifiers. Broadcasting the radio map data repeatedly and automatically may be understood such that the data is transmitted autonomously by the wireless access point, that is, without a trigger by an external server for each of the repeated transmissions. This may have the effect that a mobile device that is to be positioned does not have to be enabled to open a communication channel and that the positioning may thus be accelerated. This may further have the effect that the radio map data (or part thereof) that is transmitted in a single broadcast may be used by many mobile devices. This may save bandwidth as well as energy at the wireless access point.

According to an exemplary embodiment of the different aspects of the invention, the wireless access point is an access point according to one or more of the IEEE 802.11 standards. Accordingly, the wireless network of the wireless access point may be a non-cellular network according to one or more of the IEEE 802.11 family of standards (also marketed under the Wi-Fi brand name). The wireless access point may for instance operate on a single frequency band (2.4 GHz according to IEEE 802.11b/g or 5.0 GHz according to IEEE 802.11a/h/ac, representing the two frequency bands 2.4-2.4835 GHz, and 5.15-5.725 GHz, respectively), or on two frequencies bands (2.4 GHz and 5.0 GHz according to IEEE 802.11n, again representing the two frequency bands 2.4-2.4835 GHz, and 5.15-5.725 GHz, respectively).

However, the wireless access point may also be a wireless access point according to another wireless local area network (WLAN) standard. Generally, a WLAN is understood to be a wireless computer network that links two or more devices using wireless communication within a limited area such as a home, school, computer laboratory, or office building, which gives users the ability to move around within a local coverage area and yet still be connected to the network. A wireless access point according to one or more of the IEEE 802.11 standards is preferred though, as most modern WLANs are based on IEEE 802.11 standards.

According to an exemplary embodiment of the different aspects of the invention, the one or more identifiers are service set identifiers. A service set identifier is understood to identify a group of wireless network devices that are operating with the same networking parameters, e.g. as defined by the IEEE 802.11 standards. Thus, for instance, the service set identifier may be a basic service set identifier, which identifies units of devices operating with the same medium access characteristics (i.e. radio frequency, modulation scheme etc.), or an extended service set identifier, which identifies logical units of one or more basic service sets on the same logical network segment (i.e. IP subnet, VLAN etc.). Basic service sets are identified by BSSIDs, which are 48-bit labels that conform to MAC-48 conventions. Logical networks are identified by SSIDs, which also serve as network names. The SSID of a wireless access point is usually customizable.

According to an exemplary embodiment of the different aspects of the invention, the one or more identifiers are each 32 bytes or less. This may particular be the case for the already described SSID of the IEEE 802.11 standards, which can be zero to 32 bytes (32 octets) long. Particularly by utilizing the below described frequency transform and/or compression techniques, it is possible to carry the radio map data of a respective wireless access point by only a single identifier (or only a few identifiers, e.g. two, three or four identifiers).

According to an exemplary embodiment of the different aspects of the invention, the radio map data, which enables a determination of characteristics of radio signals transmitted by the wireless access point that are expected to be observable at different locations, is comprised by one identifier or is distributed over multiple identifiers. In case the (complete) radio map data can be comprised by a (single) identifier, the respective radio map data may be obtained and extracted particularly fast, because waiting for the identifier to change in order to obtain the other identifier(s) is not necessary. In case the (complete) radio map data is distributed over or comprised by multiple identifiers, size limitations for the identifier (which may be stipulated by the according standard) do not need to be strictly observed. For example, the identifier provided by the wireless access point may be changed periodically in this case (e.g. every x (e.g. 10) second(s)). The positioning result may be improved as overall larger and more detailed radio map data can be provided in this way. In certain embodiments, it may be possible that, even if the radio map data is comprised by multiple identifiers and not all identifiers have yet been obtained, nevertheless radio map data may already be extracted from the obtained identifiers and used for positioning. In certain embodiments, in case the radio map data is distributed over or comprised by multiple identifiers, it may be necessary to first obtain all identifiers before an extraction of radio map data and/or positioning based thereon can be performed. For instance, in case providing the radio map data requires transmitting two identifiers, the transmission of which is changed every 10 seconds at the wireless access point in an alternating manner, a mobile device can retrieve the complete radio map data in five seconds on average.

According to an exemplary embodiment of the different aspects of the invention, in case radio map data, which enables a determination of characteristics of radio signals transmitted by the wireless access point that are expected to be observable at different locations, is distributed over multiple identifiers, the identifiers further comprise paging information. The paging information may in particular identify (e.g. by a page number) the part of the radio map data comprised by the respective identifier. The paging information may comprise the total number of identifiers (and thus pages) used in this case for providing the (complete) radio map data. The part of the radio map data provided by a single identifier may thus be considered to be a single memory page of multiple memory pages comprising the (complete) radio map data. A paging mechanism may enable the radio map data to be carried in multiple parts (i.e. in multiple identifiers). The paging information may also comprise version information on the radio map data.

For instance, a part (e.g. first or last part) of the identifier (e.g. the first or last n bytes, e.g. the first or last byte) may be reserved for carrying the paging information. Therein, as an example, a lower or upper part of the respective paging information byte(s), e.g. the upper or lower n (e.g. 4) bits of the respective byte(s), may comprise a page number. For instance, a lower or upper part of the respective paging information byte(s), e.g. the upper or lower n (e.g. 4) bits of the respective byte(s), may comprise version information on the radio map data.

According to an exemplary embodiment of the different aspects of the invention, the characteristics of radio signals that are expected to be observable at different locations comprise values relating to received signal strengths of radio signals. Using received signal strength related values as characteristics of radio signals may have the effect that such values may be determined for any kind of transmitter. It may further have the effect that they may be measured at a receiving end without establishing any connection with the transmitting end. A value relating to a received signal strength of a radio signal may be for instance a received signal strength indication RSSI or a physical Rx level in dB with a reference value of 1 mW (dBm), etc. Another kind of value relating to a received signal strength of a radio signal may be for instance an indication of a path loss of a radio signal at a particular location. Other possible characteristics may comprise a timing advance (TA) value or a round-trip time value.

According to an exemplary embodiment of the different aspects of the invention, the radio map data which enables a determination of characteristics of radio signals transmitted by the wireless access point that are expected to be observable at different locations is based on or comprises frequency transformed radio map data. By utilizing a frequency transform a compression of the data may be achieved (e.g. by only selecting those frequencies which contribute the most to the radio map data). An example of a frequency transform is a discrete cosine transform (DCT). However, other frequency transforms than a DCT may be used as well. Examples of other types of frequency transforms are a Fourier Transform, a Short-Time Fourier Transform (STFT), a Z-Transform or a wavelet transform. The frequency transformed radio map data may in particular comprise (e.g. selected) frequency coefficients. The frequency transform may be applied in exemplary embodiments of the second aspect, for instance. Before or after applying a frequency transform, the radio map data may be further compressed, for instance. Accordingly, in exemplary embodiments of the third aspect, an inverse frequency transform (and optionally a corresponding decompression) may be applied in order to recover the radio map data allowing performing a position estimate.

An example of such a frequency transform and reconstruction (DCT) is given in the patent application PCT/EP2014/066585 (particularly on p. 36/37 and 41/42), which application as a whole is incorporated herein by reference.

According to an exemplary embodiment of the different aspects of the invention, the radio map data enabling a determination of characteristics of radio signals transmitted by the wireless access point that are expected to be observable at different locations is based on or comprises compressed radio map data. One example of a compression algorithm is a selection of frequency coefficients of a frequency transform, as already mentioned. Thus, compressed radio map data may in particular comprise selected frequency coefficients of frequency transformed radio map data. The compression may be applied in exemplary embodiments of the second aspect, for instance. If the radio map data is compressed, example embodiments of the third aspect may further comprise decompressing the radio map data. However, other lossy or lossless compression algorithms may be used as well. As an example of such an alternative compression, the radio map data may be compressed by computing parameters of a parametric radio model of the radio environment of each wireless access point, like a path loss model, based on the radio map data. This would allow representing the radio environment of each wireless access point by a limited set of parameter values, like the location of the wireless access point, a transmission power or apparent transmission power of the wireless access point, and a path loss exponent. Such parameters may be computed, for instance, using a Gauss-Newton method. While a compression by means of a frequency transform may enable a more accurate reconstruction of the original radio map data, the use of a parametric radio model may enable a particularly high compression of data.

According to an exemplary embodiment of the different aspects of the invention, the compressed radio map data is based on a compression utilizing at least one of:
  entropy encoding;
  Huffman encoding; and/or
  a differential encoding.

Utilizing entropy encoding may have the effect that the encoding may be lossless. In certain embodiments, the encoding (e.g. of transform indices of the frequency transform) comprises a Huffman encoding (which utilizes a prefix code (also referred to as "prefix-free" code), for generating the code table) or a differential encoding. A differential encoding may also make use of a Huffman encoding. Accordingly, in corresponding embodiments of the third aspect, a decoding of compressed radio map data may thus comprise an entropy decoding, a Huffman decoding and/or a differential decoding.

Entropy encoding may in particular comprise creating and assigning a unique code or codeword to each unique symbol that occurs in the input. The radio map data can then be compress by replacing each fixed-length input symbol (e.g. transform indices) with a corresponding variable-length output codeword. Therein, the most common symbols typically use the shortest codes (because typically the length of each codeword is approximately proportional to the negative logarithm of the probability).

In example embodiments, a differential encoding may comprise sorting the input symbols (e.g. transform indices) according to ordinal numbers associated with index values of the transform indices, wherein the ordinal numbers are associated with the index values of the transform indices based on the probability of occurrence of each index value of the transform indices. Such a differential encoding may then further comprise determining a respective distance from one ordinal number to the next to obtain a sequence of differential indices. Using a differential encoding may have the effect that the total number of bits required for representing the encoded data (e.g. transform indices) may be reduced even further.

Examples of such encodings are given in the patent application PCT/EP2015/060446 (particularly on p. 21-33), which application as a whole is incorporated herein by reference.

According to an exemplary embodiment of the different aspects of the invention, the radio map data enabling a determination of characteristics of radio signals transmitted by the wireless access point that are expected to be observable at different locations is based on or comprises at least one of:
  data of a radio model for radio signals transmitted by the wireless access point;
  data of a grid based radio image;
  compressed data of a grid based radio image;
  selected frequency coefficients of frequency transformed data of a grid based radio image;
  compressed selected frequency coefficients of frequency transformed data of a grid based radio image;
  parameter values of a parametric radio model for radio signals transmitted by the wireless access point; and/or
  parameter values of a path loss model for radio signals transmitted by the wireless access point.

In case the radio map data comprises data of a radio model for radio signals transmitted by the wireless access point, an example embodiment of the second aspect may accordingly comprise assembling such radio map data. The radio model may be of any feasible kind and in any original, encoded, compressed or otherwise processed form, of which a few examples are presented in the following.

In case the radio map data comprises data of a grid based radio image, an example embodiment of the second aspect may comprise assembling such data. A grid based radio image may be given for instance by a set of characteristics of radio signals with each characteristic assigned to a respective grid point of a grid which is defined to correspond to a certain geographical area. A respective characteristic may be assigned to all or selected grid points of the grid. Using grid based radio image data may have the effect that the radio map data may reflect details of the real radio environment particularly well. The radio map data of such a grid based radio image may be compressed radio map data or non-compressed data. If the radio map data is compressed, an example embodiment of the third aspect may further comprise decompressing the radio map data. Compressed radio map data may comprise selected frequency coefficients of frequency transformed radio map data of the grid based radio image. Such selected frequency coefficients may or may not be further compressed, for instance using any kind of lossless compression technique. If the selected frequency coefficients are compressed, an example embodiment of the third aspect may further comprise decompressing the selected frequency coefficients, before an inverse frequency transform is applied to the decompressed selected frequency coefficients to recover the radio map data of the grid based radio image. Corresponding example embodiments of the second aspect may thus comprise compressing radio map data of a grid based radio image, including for example applying a frequency transform to radio map data and/or selecting frequency coefficients of frequency transformed radio map data and/or compressing selected frequency coefficients of frequency transformed radio map data. Using compressed grid based radio image data may have the effect that the required amount of radio map data that is needed for reflecting the radio image or environment may be reduced significantly. Using selected frequency coefficients as compressed radio map data may have the effect that a reconstructed radio image may be fairly similar to the original radio image.

In case the radio map data comprises parameter values of a parametric radio model for radio signals transmitted by the wireless access point, an example embodiment of the second aspect comprises computing such parameter values for a respective wireless access point. Using parameter values of a parametric radio model may have the effect that the required amount of data for defining the characteristics of radio signals may be particularly small. An example of a parametric radio model is a path loss model for radio signals transmitted by a wireless access point. In this case, the parameters may comprise a location of the wireless access point, a path loss exponent and an indication of a transmission power used by the wireless access point.

As already described, in case the radio map data is based on a certain computation, such as a transform or compression, this computation may be performed in example embodiments of the second aspect. A corresponding computation (i.e. an inverse transform or a decompression) may be performed in example embodiments of the third aspect (e.g. before, after or as part of the extracting).

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

The following description serves to deepen the understanding of the present invention and shall be understood to complement and be read together with the description as provided in the above summary section of this specification.

Figure 1:
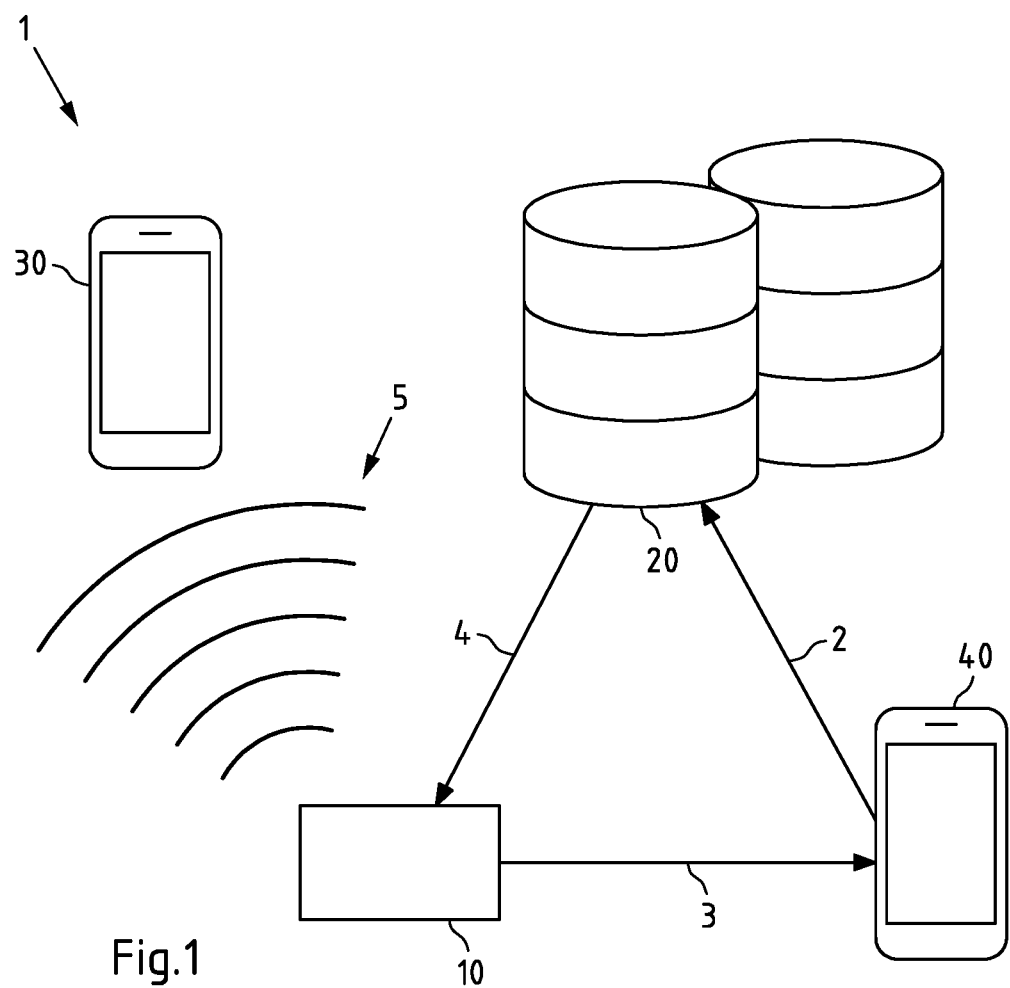
FIG. 1 is a block diagram of a system of exemplary apparatuses according to the different aspects.

FIG. 1 is a block diagram of a system 1 comprising a first apparatus 10, which is in this case a wireless access point, more specifically a WLAN access point according to a IEEE 802.11 standard (Wi-Fi access point), a second apparatus 20, which is in this case a server, such as a remote server or a computer cloud, and a third apparatus 30, which is in this case a mobile device such as a cellular phone, a personal digital assistant, a laptop computer, a tablet computer or a wearable, which is enabled to position itself by means of embodiments of the first method as described.

Also depicted is a mobile device 40, which is used in the training or collecting stage (radio mapping) and which may generally be a mobile device of any of the described types (e.g. a cellular phone or the like).

In the following, the apparatuses 10, 20 and 30 will be referred to as a wireless access point 10, server 20 and mobile device 30 as examples apparatuses according to the invention. The apparatuses may separately or together perform exemplary embodiments of the different methods according to the invention. Further details of wireless access point 10, server 20 and mobile device 30 are described with respect to FIGS. 2, 3 and 4, respectively, which are exemplary block diagrams of the respective apparatuses.

Figure 2:
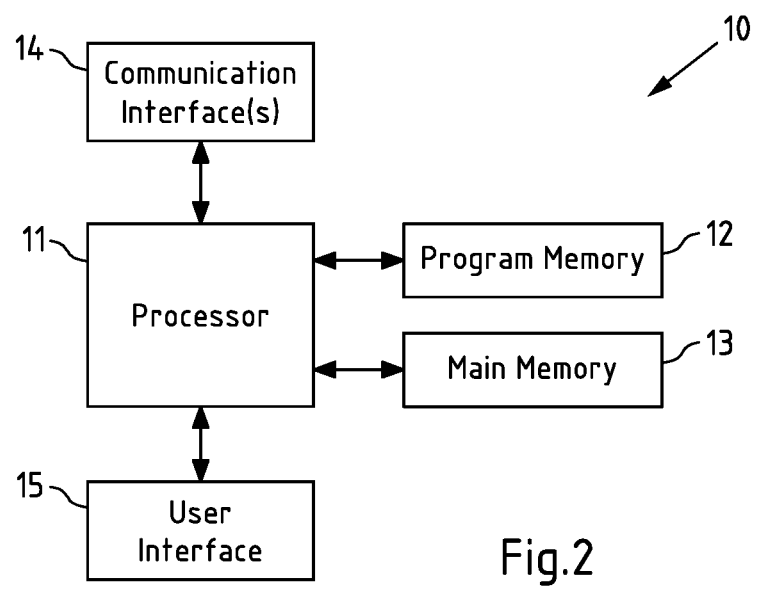
FIG. 2 is a block diagram of the wireless access point of FIG. 1 as an example of an apparatus according to the first aspect of the invention.

Turning now to FIG. 2, the wireless access point 10 comprises a processor 11. Processor 11 may represent a single processor or two or more processors, which are for instance at least partially coupled, for instance via a bus. Processor 11 executes a program code stored in program memory 12 (for instance program code causing the wireless access point 10 to perform embodiments of the first method, when executed on processor 11), and interfaces with a main memory 13. Some or all of memories 12 and 13 may also be included into processor 11. One of or both of memories 12 and 13 may be fixedly connected to processor 11 or at least partially removable from processor 11. Program memory 12 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Program memory 12 may also comprise an operating system for processor 11. Main memory 13 may for instance be a volatile memory. It may for instance be a RAM or DRAM memory, to give but a few non-limiting examples. It may for instance be used as a working memory for processor 11 when executing an operating system and/or programs.

Processor 11 further controls a communication interface 14 configured to receive and/or sent information. For instance, communication interface 14 may be configured to communicate with (e.g. send and/or receive data to/from) server 20, mobile device 30 and/or mobile device 40. This in particular comprises automatically and repeatedly providing (i.e. broadcasting), by the wireless access point, one or more identifiers (e.g. the SSID) of the wireless access point, in order to provide radio map data or a part thereof included in the respective identifiers to mobile devices 30. The mobile devices 30 receiving the one or more identifiers can then determine their position based on the radio map data. Further, the communication also comprises receiving, from server 20, corresponding radio map data, which has been assembled specifically for the wireless access point 10 and which serves as a basis for the repeated provision of the one or more identifiers comprising the radio map data or a part thereof by the wireless access point 10. The communication may for instance be based on a (e.g. partly) wireless connection. The communication interface 14 may thus comprise circuitry such as modulators, filters, mixers, switches and/or one or more antennas to allow transmission and/or reception of signals.

Communication interface 14 is thus at least configured to allow communication according to a non-cellular WLAN network. However, in embodiments of the invention, communication interface 14 may also be configured to allow communication according to a 2G/3G/4G and/or 5G cellular communication system and/or other communication system. In any case, the communication route between wireless access point 10 and other apparatuses (specifically server 20) may equally well at least partially comprise wire-bound portions. For instance, wireless access point 10 may be connected to a back-bone of a wireless communication system via a wire-bound system.

Processor 11 may further control a user interface 15 configured to present information to a user of the wireless access point 10 and/or to receive information from such a user.

The components 12-15 of wireless access point 10 may for instance be connected with processor 11 by means of one or more serial and/or parallel busses.

Figure 3:
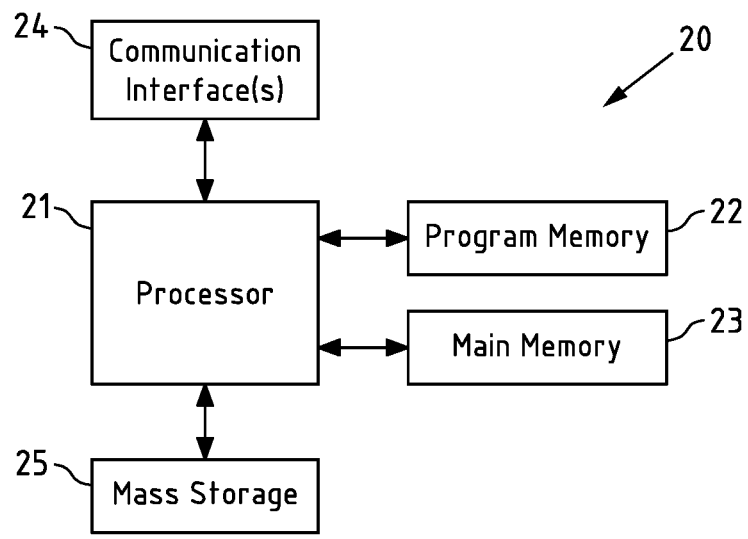
FIG. 3 is a block diagram of the server of FIG. 1 as an example of an apparatus according to the second aspect of the invention.

Turning now to FIG. 3, an exemplary block diagram of a server 20 of FIG. 1 is shown. Similarly to FIG. 2, server 20 comprises a processor 21. Processor 21 may represent a single processor or two or more processors, which are for instance at least partially coupled, for instance via a bus. Similar to FIG. 2, processor 21 may use program memory 22 and main memory 23 to execute a program code stored in program memory 22 (for instance program code causing server 20 to perform embodiments of the second method, when executed on processor 21).

Processor 21 further controls a communication interface 24 configured to receive and/or send information. For instance, server 20 may be configured to communicate with wireless access point 10 of system 1 of FIG. 1. As already explained above, this may particularly comprise providing radio map data assembled for the respective wireless access point 10 as a basis for a repeated provision of one or more identifiers comprising the radio map data or a part thereof by the respective wireless access point 10 to enable mobile device 30 receiving the one or more identifiers from wireless access point 10 to determine its position. Further, this may also comprise obtaining (e.g. receiving from mobile device 40) characteristics of radio signals, which are transmitted by the wireless access point 10 and which have been measured by the mobile device 40 at one or more locations, and indications of the respective measurement locations. The communication may for instance be based on a (e.g. partly) wireless connection. The communication interface 24 may thus comprise circuitry such as modulators, filters, mixers, switches and/or one or more antennas to allow transmission and/or reception of signals. In embodiments of the invention, communication interface 24 is inter alia configured to allow communication according to a 2G/3G/4G/5G cellular communication system and/or a non-cellular communication system, such as for instance a WLAN network. For instance, wireless access point 10 may be connected to a back-bone of a wireless communication system via a wire-bound system, such as the internet.

Processor 21 further interfaces with a mass storage 25, which may be part of the server 20 or remote from server 20, and which may for instance be used to store one or more databases. For instance, server 20 may store, in a database, collected information from crowd sourcing processes. The database may for instance store characteristics of radio signals of wireless access points (such as wireless access point 10) measured by mobile devices (such as mobile device 40) at different locations and corresponding indications of measurement locations. This data can then be used to assemble respective radio map data, which may also be stored in mass storage 25.

Figure 4:
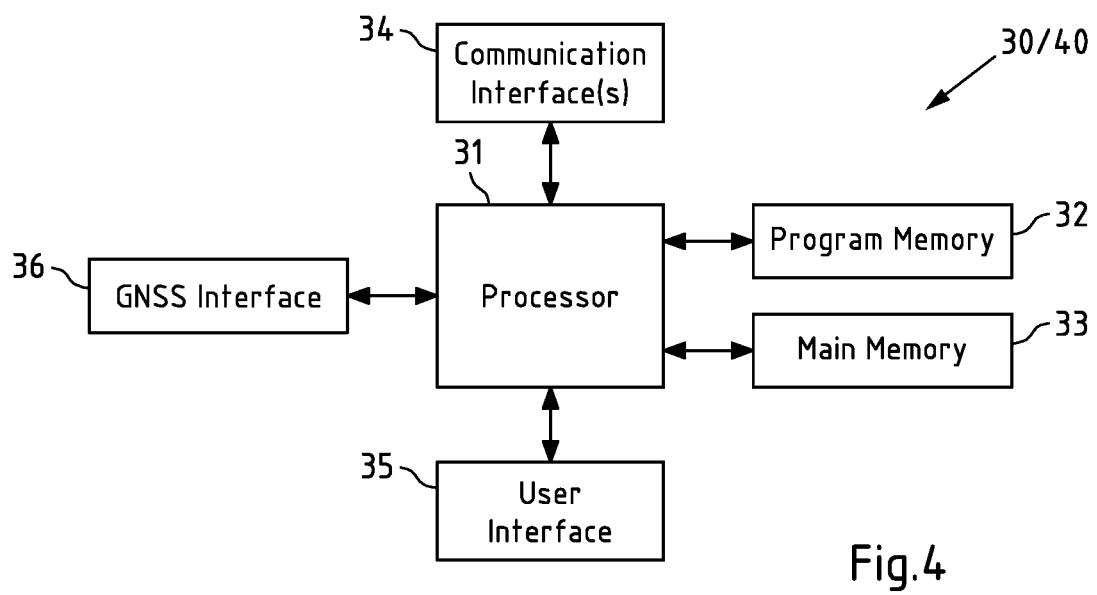
FIG. 4 is a block diagram of the mobile device of FIG. 1 as an example of an apparatus according to the third aspect of the invention.

Turning now to FIG. 4, an exemplary block diagram of a mobile device, such as mobile device 30 or 40 of FIG. 1 is shown. Similarly to FIGS. 2 and 3, mobile device 30/40 comprises a processor 31. Processor 31 may represent a single processor or two or more processors, which are for instance at least partially coupled, for instance via a bus. Similar to FIGS. 2 and 3 processor 31 may use program memory 32 and main memory 33 to execute a program code stored in program memory 32 (for instance program code causing mobile device 30 to perform embodiments of the third method, when executed on processor 31).

Processor 31 further controls a communication interface 34 configured to receive and/or send information. For instance, in case of mobile device 30, the mobile device 30 may be configured to at least communicate with wireless access point 10 of system 1 of FIG. 1. This may for instance at least comprise receiving an identifier from wireless access point 10. In case of mobile device 40, the mobile device 40 may at least be configured to measure characteristics of radio signals transmitted by a plurality of wireless access points (such as access point 10) and provide these characteristics together with respective indications of the measurement locations, e.g. to server 20.

The described communication may for instance be based on a (e.g. partly) wireless connection. The communication interface 34 may thus comprise circuitry such as modulators, filters, mixers, switches and/or one or more antennas to allow transmission and/or reception of signals. For instance, communication interface 34 is at least configured to allow communication according to a non-cellular communication system, such as for instance a WLAN network, in order to communicate with wireless access point 10. In embodiments of the invention, communication interface 34 may also be configured to allow communication according to a 2G/3G/4G and/or 5G cellular communication system.

Processor 31 further controls a user interface 35 configured to present information to a user of mobile device 30/40 and/or to receive information from such a user, such as manually input position fixes or the like. User interface 34 may for instance be the standard user interface via which a user of mobile device 30/40 controls other functionality thereof, such as making phone calls, browsing the Internet, etc.

Processor 31 may further control a GNSS interface 36 configured to receive positioning information of an GNSS such as Global Positioning System (GPS), Galileo, Global Navigation Satellite System (i.e. "Globalnaja Nawigazionnaja Sputnikowaja Sistema", GLONASS) and Quasi-Zenith Satellite System (QZSS). In case of mobile device 40, the positioning information of GNSS interface 36 (potentially in connection with further sensors of mobile device 40, such as inertial sensor, e.g. accelerometer or gyroscope) may be used in order to obtain the indications of the locations of measurement. It should be noted that, in case of mobile device 30, even though mobile device 30 has a GNSS interface 36, a positioning technique as described herein with respect to the third aspect is advantageous, since such a technique may provide for instance provide a position estimate and/or a higher accuracy in challenging environments for GNSS-based technologies.

Figure 5:
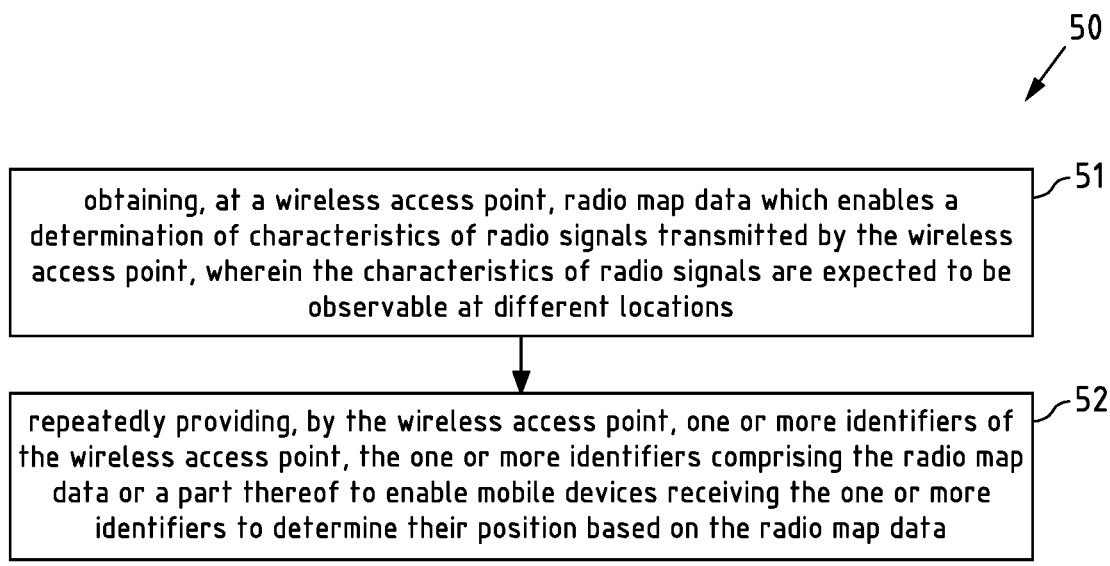
FIG. 5 is a flow chart illustrating an example of a method according to the first aspect.
Figure 6:
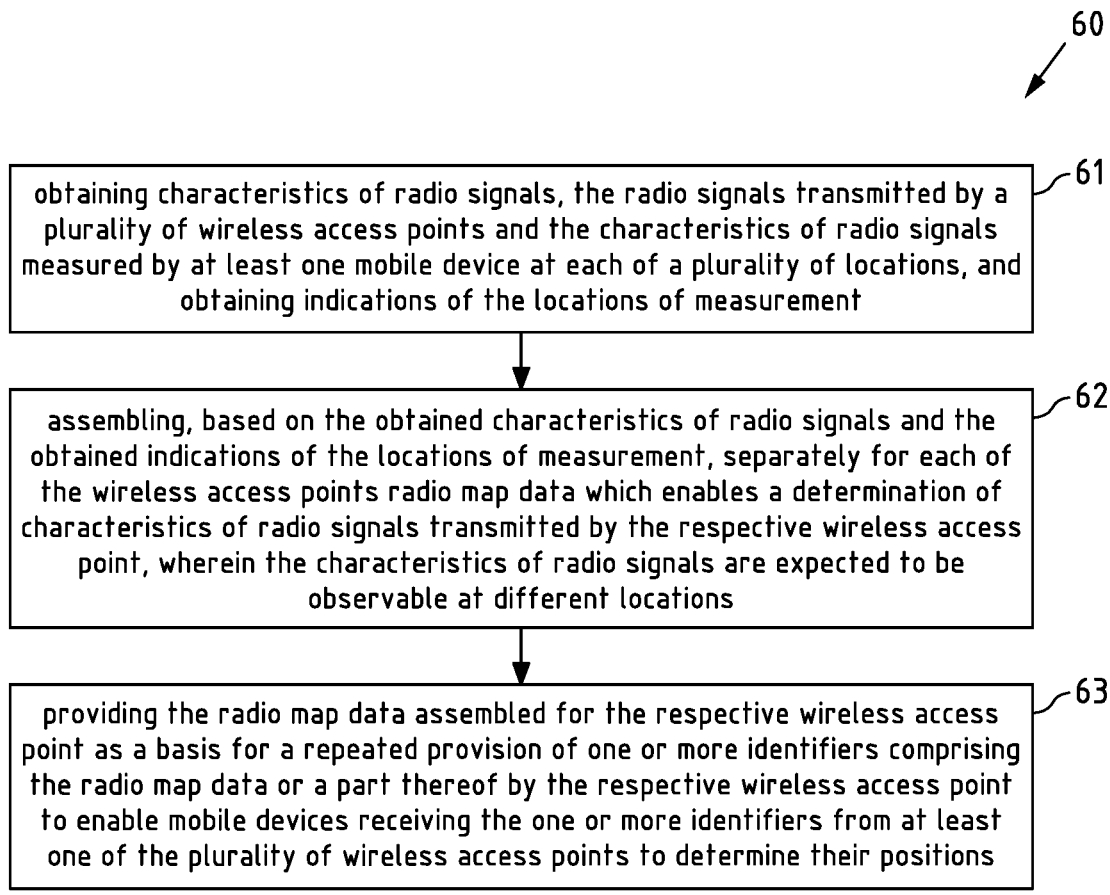
FIG. 6 is a flow chart illustrating an example of a method according to the second aspect.
Figure 7:
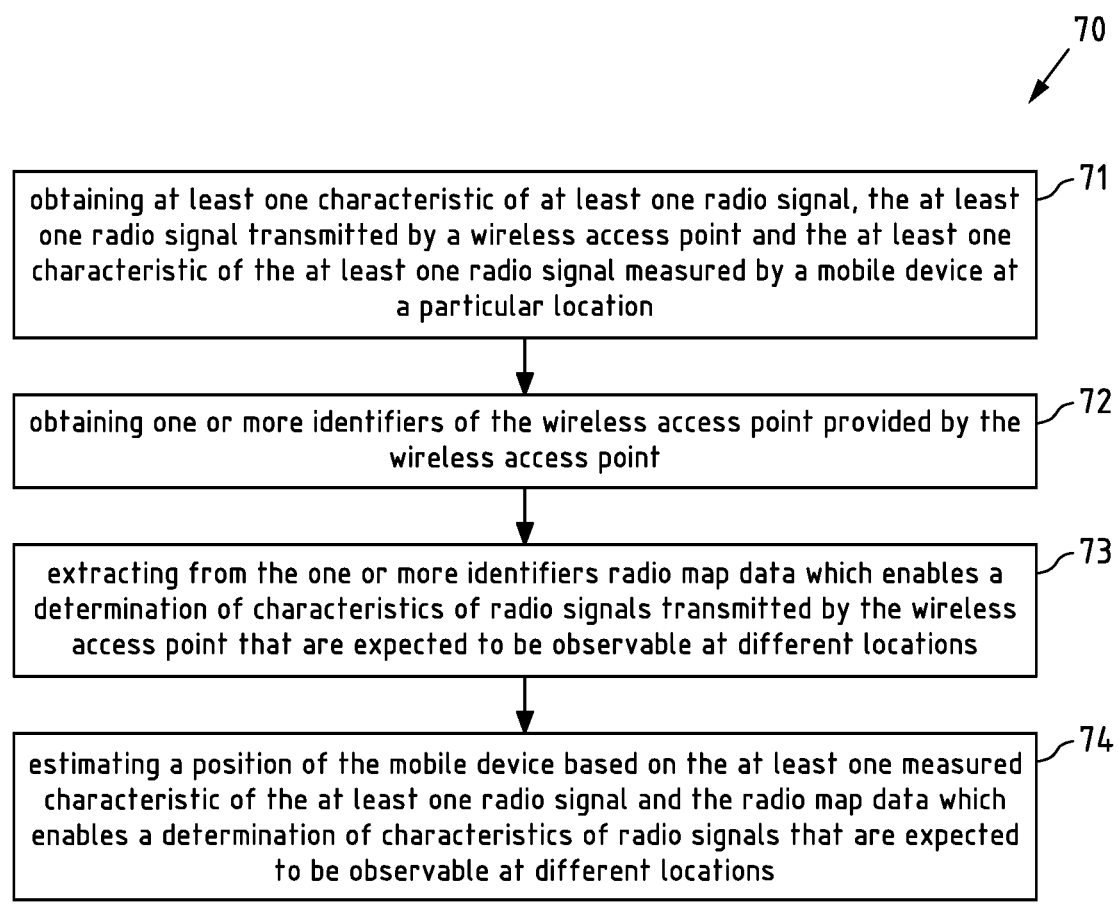
FIG. 7 is a flow chart illustrating an example of a method according to the third aspect.

Exemplary embodiments of the different methods will now be described with reference to FIGS. 5-7. Therein, FIG. 5 is flow chart 50 illustrating an exemplary embodiment of a first method, FIG. 6 is flow chart 60 illustrating an exemplary embodiment of a second method, and FIG. 7 is a flow chart 70 illustrating an exemplary embodiment of a third method.

First, an example of the first method, which will allow a wireless access point 10 to provide identifier(s) comprising radio map data, will be explained with reference to FIG. 6. The flow chart 60 of FIG. 6 illustrates the example of the second method, which is performed by server 20.

At server 20 characteristics of radio signals and indications of measurement locations are obtained (action 61), as also indicated by arrow 2 in FIG. 1. The radio signals have been transmitted by a plurality of wireless access points (such as wireless access point 10), as also indicated by arrow 3 in FIG. 1. The characteristics of these radio signals are then again measured by at least one mobile device (such as mobile device 40) at each of a plurality of locations, for which the indications of the locations of measurement are also obtained.

Based on the obtained characteristics of radio signals and the obtained indications of the locations of measurement, radio map data is assembled (action 62). This is done separately for each of the wireless access points 10. The radio map data enables a determination of characteristics of radio signals transmitted by the respective wireless access point 10, wherein the characteristics of radio signals are expected to be observable at different locations.

This data processing can for instance be performed in the cloud. The radio map data (e.g. radio image) is preferably encoded and/or compressed, e.g. by using the mechanisms described above, i.e. in particular a frequency transform and a Huffman coding.

After the encoding and compressing (e.g. with DCT and Huffman coding) the radio map data is a bit string that can be presented e.g. in terms of hexadecimal numbers (0-9, A-F), which can readily be set to be the identifier (the SSID in this example) of the wireless access point 10.

The radio map data is then provided to wireless access point 10, as also indicated by arrow 4 in FIG. 1. The radio map data is assembled for the respective wireless access point 10 as a basis for a repeated broadcasting (as indicated by broadcasting signal 5 in FIG. 1) of one or more identifiers comprising the radio map data or a part thereof by the respective wireless access point 10. This enables mobile devices 30, which are receiving the one or more identifiers from at least one of the plurality of wireless access points 10 to determine their own positions, as described with reference to FIG. 7 further below.

The flow chart 50 of FIG. 5 now illustrates the example of the first method, which is performed by wireless access point 10.

At wireless access point 10, radio map data is obtained (action 51), e.g. from server 20 (arrow 4). As explained, the radio map data enables a determination of characteristics of radio signals transmitted by the wireless access point 10, wherein the characteristics of radio signals are expected to be observable at different locations.

The wireless access point then repeatedly provides (broadcasting signal 5 of FIG. 1) one or more identifiers (i.e. one or more SSIDs in this case) of the wireless access point 10 (action 52). The one or more identifiers comprise the radio map data or a part thereof. This enables mobile devices 30, which receive the one or more identifiers, to determine their position based on the radio map data. The wireless access point 10 can in this way in particular broadcast its own radio image in the wireless access point's identifier. This advertising of the identifier (i.e. the SSID in this example) (possibly along with other information) may be done periodically in frames (which may be considered as beacon frames).

In case of an SSID, the SSID is 32 bytes long and it has been found, that the radio image for a wireless access point can be encoded sufficiently in such a small number of bytes. Also, if a 32-byte identifier is not enough, a paging mechanism can be introduced, so that the radio map data can be carried in multiple parts by changing the SSID of the wireless access point periodically. For example, the first byte of the SSID can be reserved for carrying paging information. A possible scheme is to use the lower 4 bits for the version of the radio map data, and the upper 4 bits for the page number. The page can be changed e.g. every 10 seconds. Thus, in case carrying the radio map data takes two 32-bytes messages, the mobile device can retrieve this on average in 5 seconds.

The flow chart 70 of FIG. 7 now illustrates the example of the third method, which is in this case performed by mobile device 30, but which could generally also be performed by another device. This allows a positioning of the mobile device 30, in particular without a connection to server 20.

At least one characteristic of at least one radio signal transmitted by wireless access point 10 is measured by mobile device 30 at a particular location. The least one characteristic of the at least one radio signal is thus obtained at mobile device 30 (action 71).

Also, one or more identifiers of the wireless access point 10 provided by the wireless access point 10 are obtained at the mobile device 30 (action 72). This may be done by the mobile device 30 by listening to and capturing the respective frames in order to learn the wireless access point's identifier.

For instance, the SSID is easily available from the scan result of the mobile device 30. As the SSID itself is a basic feature of the WiFi technology, it works on practically any mobile device. Thus, the SSID allows for broadcasting small-size radio map data from the wireless access point to the mobile device.

From the one or more identifiers radio map data can then be extracted (action 73). The radio map data enables a determination of characteristics of radio signals transmitted by the wireless access point 10 that are expected to be observable at different locations.

A position of the mobile device 30 is now estimated based on the at least one measured characteristic of the at least one radio signal and the radio map data (action 74). Advantageously, the mobile device 30 does not need a data connection to server 20 (or any other server) in order to estimate its own opposition, as the relevant radio map data of the wireless access point 10 is included in the identifier(s) of the wireless access point 10 itself.

Thus, the mobile device 30 can capture the broadcast of the wireless access point 10 and perform a positioning based thereon. Upon reception of the identifier (i.e. SSID in this example), in order to obtain usable radio map data (e.g. radio image), the mobile device may need to decode and/or decompress the radio map data, as described above, before the radio map data can be used for positioning. In other words, the mobile device 30 decodes the identifier from the respective frame(s) and can, therefore, recover the radio map data of the broadcasting wireless access point.

Figure 8:
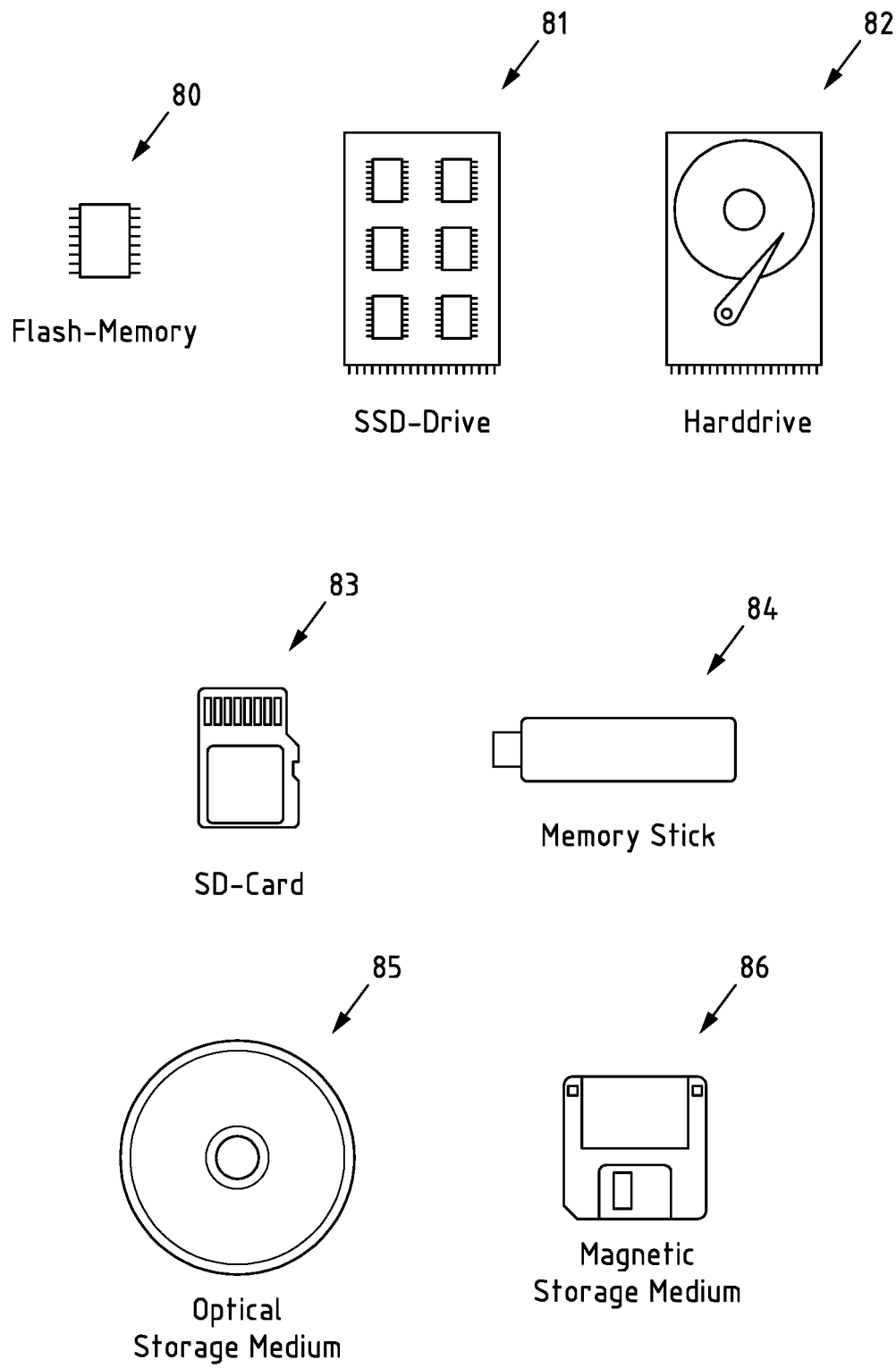
FIG. 8 is a schematic illustration of examples of tangible storage media according to the invention.

FIG. 8 is a schematic illustration of examples of tangible storage media according to the present invention, that may for instance be used to implement program memory 12 of FIG. 2, program memory 2 of FIG. 3 and/or program memory 32 of FIG. 4. To this end, FIG. 8 displays a flash memory 80, which may for instance be soldered or bonded to a printed circuit board, a solid-state drive 81 comprising a plurality of memory chips (e.g. Flash memory chips), a magnetic hard drive 82, a Secure Digital (SD) card 83, a Universal Serial Bus (USB) memory stick 84, an optical storage medium 85 (such as for instance a CD-ROM or DVD) and a magnetic storage medium 86.

The following embodiments are also disclosed:
1) A method, performed by at least one apparatus, the method comprising:
   obtaining, at a wireless access point, radio map data which enables a determination of characteristics of radio signals transmitted by the wireless access point, wherein the characteristics of radio signals are expected to be observable at different locations; and repeatedly providing, by the wireless access point, one or more identifiers of the wireless access point, the one or more identifiers comprising the radio map data or a part thereof to enable mobile devices receiving the one or more identifiers to determine their position based on the radio map data.

2) The method of embodiment 1, wherein the one or more identifiers are provided by the wireless access point by automatically and repeatedly broadcasting the one or more identifiers.

3) The method of embodiment 1 or 2, wherein the wireless access point is an access point according to one or more of the IEEE 802.11 standards.

4) The method of any of embodiments 1 to 3, wherein the one or more identifiers are service set identifiers.

5) The method of any of embodiments 1 to 4, wherein the one or more identifiers are each 32 bytes or less.

6) The method of any of embodiments 1 to 5, wherein the radio map data, which enables a determination of characteristics of radio signals transmitted by the wireless access point that are expected to be observable at different locations, is comprised by one identifier or is distributed over multiple identifiers.

7) The method of any of embodiments 1 to 6, wherein, in case radio map data, which enables a determination of characteristics of radio signals transmitted by the wireless access point that are expected to be observable at different locations, is distributed over multiple identifiers, the identifiers further comprise paging information.

8) The method of any of embodiments 1 to 7, wherein the characteristics of radio signals that are expected to be observable at different locations comprise values relating to received signal strengths of radio signals.

9) The method of any of embodiments 1 to 8, wherein the radio map data which enables a determination of characteristics of radio signals transmitted by the wireless access point that are expected to be observable at different locations is based on or comprises frequency transformed radio map data.

10) The method of any of embodiments 1 to 9, wherein the radio map data enabling a determination of characteristics of radio signals transmitted by the wireless access point that are expected to be observable at different locations is based on or comprises compressed radio map data.

11) The method of embodiment 10, wherein the compressed radio map data is based on a compression utilizing at least one of:
entropy encoding;
Huffman encoding; and/or
a differential encoding.

12) The method of any of embodiments 1 to 11, wherein the radio map data enabling a determination of characteristics of radio signals transmitted by the wireless access point that are expected to be observable at different locations is based on or comprises at least one of:
data of a radio model for radio signals transmitted by the wireless access point;
data of a grid based radio image;
compressed data of a grid based radio image;
selected frequency coefficients of frequency transformed data of a grid based radio image;
compressed selected frequency coefficients of frequency transformed data of a grid based radio image;
parameter values of a parametric radio model for radio signals transmitted by the wireless access point; and/or
parameter values of a path loss model for radio signals transmitted by the wireless access point.

13) A method, performed by at least one apparatus, the method comprising:
obtaining characteristics of radio signals, the radio signals transmitted by a plurality of wireless access points and the characteristics of radio signals measured by at least one mobile device at each of a plurality of locations, and obtaining indications of the locations of measurement;
assembling, based on the obtained characteristics of radio signals and the obtained indications of the locations of measurement, separately for each of the wireless access points radio map data which enables a determination of characteristics of radio signals transmitted by the respective wireless access point, wherein the characteristics of radio signals are expected to be observable at different locations; and
providing the radio map data assembled for the respective wireless access point as a basis for a repeated provision of one or more identifiers comprising the radio map data or a part thereof by the respective wireless access point to enable mobile devices receiving the one or more identifiers from at least one of the plurality of wireless access points to determine their positions.

14) A method, performed by at least one apparatus, the method comprising:
obtaining at least one characteristic of at least one radio signal, the at least one radio signal transmitted by a wireless access point and the at least one characteristic of the at least one radio signal measured by a mobile device at a particular location;
obtaining one or more identifiers of the wireless access point provided by the wireless access point;
extracting from the one or more identifiers radio map data which enables a determination of characteristics of radio signals transmitted by the wireless access point that are expected to be observable at different locations; and
estimating a position of the mobile device based on the at least one measured characteristic of the at least one radio signal and the radio map data which enables a determination of characteristics of radio signals that are expected to be observable at different locations.

15) An apparatus comprising means for performing the actions of the method of any of embodiments 1 to 14.

16) An apparatus comprising at least one processor and at least one memory including computer program code, the at least one memory and the computer program code configured to, with the at least one processor, cause an apparatus at least to perform a method of any of the embodiments 1 to 14.

17) The apparatus according to embodiment 15 or 16, wherein the apparatus is or comprises one of:
a module for a wireless access point;
a wireless access point;
a module for a server;
a server;
a module for a mobile device; or
a mobile device.

18) A computer program code, the computer program code, when executed by a processor, causing an apparatus to perform a method of any of embodiments 1 to 14.

19) A computer readable storage medium in which computer program code is stored, the computer program code causing at least one apparatus perform when executed by a processor a method of any of embodiments 1 to 14.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors of FIGS. 2 and 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

The invention claimed is:

1. A method, performed by at least one apparatus, the method comprising:
 obtaining, at a wireless access point, radio map data which enables a determination of characteristics of radio signals transmitted by the wireless access point, wherein the characteristics of radio signals are expected to be observable at different locations; and
 repeatedly providing, by the wireless access point, one or more identifiers of the wireless access point, the one or more identifiers comprising the radio map data to enable mobile devices receiving the one or more identifiers to determine their position based on the radio map data.

2. The method of claim 1, wherein the one or more identifiers are provided by the wireless access point by automatically and repeatedly broadcasting the one or more identifiers.

3. The method of claim 1, wherein the one or more identifiers are service set identifiers.

4. The method of claim 1, wherein the one or more identifiers are each 32 bytes or less.

5. The method of claim 1, wherein the radio map data, which enables a determination of characteristics of radio signals transmitted by the wireless access point that are expected to be observable at different locations, is comprised by one identifier or is distributed over multiple identifiers.

6. The method of claim 1, wherein, in case radio map data, which enables a determination of characteristics of radio signals transmitted by the wireless access point that are expected to be observable at different locations, is distributed over multiple identifiers, the identifiers further comprise paging information.

7. The method of claim 1, wherein the characteristics of radio signals that are expected to be observable at different locations comprise values relating to received signal strengths of radio signals.

8. The method of claim 1, wherein the radio map data which enables a determination of characteristics of radio signals transmitted by the wireless access point that are expected to be observable at different locations is based on or comprises frequency transformed radio map data.

9. The method of claim 1, wherein the radio map data enabling a determination of characteristics of radio signals transmitted by the wireless access point that are expected to be observable at different locations is based on or comprises compressed radio map data.

10. The method of claim 9, wherein the compressed radio map data is based on a compression utilizing at least one of:
 entropy encoding;
 Huffman encoding; and/or
 a differential encoding.

11. The method of claim 1, wherein the radio map data enabling a determination of characteristics of radio signals transmitted by the wireless access point that are expected to be observable at different locations is based on or comprises at least one of:
 data of a radio model for radio signals transmitted by the wireless access point;
 data of a grid based radio image;
 compressed data of a grid based radio image;
 selected frequency coefficients of frequency transformed data of a grid based radio image;
 compressed selected frequency coefficients of frequency transformed data of a grid based radio image;
 parameter values of a parametric radio model for radio signals transmitted by the wireless access point; and/or
 parameter values of a path loss model for radio signals transmitted by the wireless access point.

12. A method, performed by at least one apparatus, the method comprising:
 obtaining characteristics of radio signals, the radio signals transmitted by a plurality of wireless access points and the characteristics of radio signals measured by at least one mobile device at each of a plurality of locations, and obtaining indications of the locations of measurement;

assembling, based on the obtained characteristics of radio signals and the obtained indications of the locations of measurement, separately for each of the wireless access points radio map data which enables a determination of characteristics of radio signals transmitted by the respective wireless access point, wherein the characteristics of radio signals are expected to be observable at different locations; and providing the radio map data assembled for the respective wireless access point as a basis for a repeated provision of one or more identifiers comprising the radio map data by the respective wireless access point to enable mobile devices receiving the one or more identifiers from at least one of the plurality of wireless access points to determine their positions.

13. A method, performed by at least one apparatus, the method comprising:

obtaining at least one characteristic of at least one radio signal, the at least one radio signal transmitted by a wireless access point and the at least one characteristic of the at least one radio signal measured by a mobile device at a particular location;

obtaining one or more identifiers of the wireless access point provided by the wireless access point, the one or more identifiers provided by the wireless access point comprising radio map data which enables a determination of characteristics of radio signals transmitted by the wireless access point, wherein the characteristics of radio signals are expected to be observable at different locations, and wherein the radio map data enables the mobile device receiving the one or more identifiers to determine its position based on the radio map data;

extracting from the one or more identifiers the radio map data which enables the determination of characteristics of radio signals transmitted by the wireless access point that are expected to be observable at different locations; and estimating a position of the mobile device based on the at least one measured characteristic of the at least one radio signal and the radio map data which enables the determination of characteristics of radio signals that are expected to be observable at different locations.

14. An apparatus comprising at least one processor and at least one memory including computer program code, the at least one memory and the computer program code configured to, with the at least one processor, cause an apparatus at least to perform:

obtaining, at a wireless access point, radio map data which enables a determination of characteristics of radio signals transmitted by the wireless access point, wherein the characteristics of radio signals are expected to be observable at different locations; and repeatedly providing, by the wireless access point, one or more identifiers of the wireless access point, the one or more identifiers comprising the radio map data to enable mobile devices receiving the one or more identifiers to determine their position based on the radio map data.

15. The apparatus according to claim 14, wherein the apparatus is or comprises:

a module for a wireless access point; or a wireless access point.

16. An apparatus comprising at least one processor and at least one memory including computer program code, the at least one memory and the computer program code configured to, with the at least one processor, cause an apparatus at least to perform:

obtaining characteristics of radio signals, the radio signals transmitted by a plurality of wireless access points and the characteristics of radio signals measured by at least one mobile device at each of a plurality of locations, and obtaining indications of the locations of measurement;

assembling, based on the obtained characteristics of radio signals and the obtained indications of the locations of measurement, separately for each of the wireless access points radio map data which enables a determination of characteristics of radio signals transmitted by the respective wireless access point, wherein the characteristics of radio signals are expected to be observable at different locations; and providing the radio map data assembled for the respective wireless access point as a basis for a repeated provision of one or more identifiers comprising the radio map data by the respective wireless access point to enable mobile devices receiving the one or more identifiers from at least one of the plurality of wireless access points to determine their positions.

17. The apparatus according to claim 16, wherein the apparatus is or comprises:

a module for a server; or a server.

18. An apparatus comprising at least one processor and at least one memory including computer program code, the at least one memory and the computer program code configured to, with the at least one processor, cause an apparatus at least to perform:

obtaining at least one characteristic of at least one radio signal, the at least one radio signal transmitted by a wireless access point and the at least one characteristic of the at least one radio signal measured by a mobile device at a particular location;

obtaining one or more identifiers of the wireless access point provided by the wireless access point, the one or more identifiers provided by the wireless access point comprising radio map data which enables a determination of characteristics of radio signals transmitted by the wireless access point, wherein the characteristics of radio signals are expected to be observable at different locations, and wherein the radio map data enables the mobile device receiving the one or more identifiers to determine its position based on the radio map data;

extracting from the one or more identifiers the radio map data which enables the determination of characteristics of radio signals transmitted by the wireless access point that are expected to be observable at different locations; and estimating a position of the mobile device based on the at least one measured characteristic of the at least one radio signal and the radio map data which enables the determination of characteristics of radio signals that are expected to be observable at different locations.

19. The apparatus according to claim 18, wherein the apparatus is or comprises:

a module for a mobile device; or a mobile device.

20. The method of claim 1, wherein the wireless access point is configured to communicate according to a non-cellular WLAN network or one of a 2G, 3G, 4G, or 5G cellular communication system.

21. The method of claim 1, wherein the radio map data that is included in the one or more identifiers comprises, for each of a plurality of locations, the characteristics of the radio signals transmitted by the wireless access point that are expected to be observable at a respective location.

\* \* \* \* \*